(12) United States Patent
Toscano

(10) Patent No.: US 11,503,917 B2
(45) Date of Patent: Nov. 22, 2022

(54) REVERSIBLE SEAT ASSEMBLY

(71) Applicant: Damian Toscano, Doral, FL (US)

(72) Inventor: Damian Toscano, Doral, FL (US)

(*) Notice: Subject to any disclaimer, the term of this patent is extended or adjusted under 35 U.S.C. 154(b) by 460 days.

(21) Appl. No.: 16/680,048

(22) Filed: Nov. 11, 2019

(65) Prior Publication Data
US 2021/0139149 A1 May 13, 2021

(51) Int. Cl.
| | | |
|---|---|---|
| *A47C 9/00* | (2006.01) | |
| *A47C 7/14* | (2006.01) | |
| *A61G 15/00* | (2006.01) | |
| *B60N 2/22* | (2006.01) | |
| *B60N 2/75* | (2018.01) | |
| *B60N 2/838* | (2018.01) | |
| *B64D 11/06* | (2006.01) | |

(52) U.S. Cl.
CPC ........... *A47C 9/005* (2013.01); *A47C 7/14* (2013.01); *B60N 2/22* (2013.01); *B60N 2/2222* (2013.01); *B60N 2/75* (2018.02); *B60N 2/773* (2018.02); *B60N 2/838* (2018.02); *B64D 11/064* (2014.12); *B64D 11/0642* (2014.12); *B64D 11/0644* (2014.12); *A61G 15/007* (2013.01); *B64D 11/0639* (2014.12)

(58) Field of Classification Search
CPC .......... A47C 9/005; A47C 7/14; A61G 15/007
USPC ..................................................... 297/284.3
See application file for complete search history.

(56) References Cited

U.S. PATENT DOCUMENTS

| | | |
|---|---|---|
| 2,148,953 A | 2/1939 | Meissner |
| 2,383,173 A | 8/1945 | Watter |
| 3,012,817 A | 12/1961 | Hendrickson et al. |
| 4,736,982 A | 4/1988 | Hwang |
| 4,784,352 A | 11/1988 | Smith et al. |

(Continued)

FOREIGN PATENT DOCUMENTS

WO   WO2014147449   9/2014

OTHER PUBLICATIONS

Extended European Search Report that includes the Supplementary Search Report and European search opinion for EP20725981.3; dated Nov. 10, 2021; European Patent Office; Entire document.

(Continued)

*Primary Examiner* — David R Dunn
*Assistant Examiner* — Tania Abraham
(74) *Attorney, Agent, or Firm* — Allen, Dyer, Doppelt & Gilchrist, P.A.

(57) ABSTRACT

A reversible seat assembly for use with an airplane. The reversible seat comprises a base assembly and a vertical assembly. The base assembly and the vertical assembly are connected to a support structure and are collectively disposable into and out of a first travel position, a second travel position, and a third travel position. In the first and second travel positions a user or passenger may assume a usual sitting position. In the third travel position the user may assume a reverse sitting position. The base assembly comprises a right segment and a left segment connected and rotationally movable to a central segment. The vertical assembly comprises a lower segment and an upper segment connected to and rotationally movable a middle segment. The reversible seat assembly may further comprise a back armrest connected to an opposite side of said middle segment and structure to provide support to the arms of the user.

12 Claims, 5 Drawing Sheets

(56) References Cited

U.S. PATENT DOCUMENTS

| | | |
|---|---|---|
| 5,186,519 A | 2/1993 | Larson |
| 5,762,402 A | 6/1998 | Gillotti |
| 5,921,696 A | 7/1999 | Gillotti |
| 5,971,485 A | 10/1999 | Clark |
| 6,065,808 A | 5/2000 | Tinsley |
| 6,691,970 B1 | 2/2004 | Sutton, Sr. |
| 6,739,660 B2 | 5/2004 | Dukes |
| 6,769,736 B2 | 8/2004 | Roleder et al. |
| 7,000,987 B2 * | 2/2006 | Staarink .................. A47C 7/46 297/354.11 |
| 7,131,698 B2 | 11/2006 | Dowty et al. |
| 7,144,080 B2 | 12/2006 | Lloyd |
| 7,178,871 B1 | 2/2007 | Round et al. |
| 7,234,768 B2 | 6/2007 | Manning |
| 10,266,271 B2 | 4/2019 | Udriste et al. |
| 2002/0096929 A1 | 7/2002 | Showerman |
| 2007/0052275 A1 | 3/2007 | Ghilzai |
| 2012/0139302 A1 | 6/2012 | Estevenin et al. |
| 2012/0158138 A1 | 6/2012 | Brinkerhoff et al. |
| 2013/0307298 A1 | 11/2013 | Meiki |
| 2014/0138991 A1 | 5/2014 | Deimen et al. |
| 2014/0306060 A1 | 10/2014 | Schomacker et al. |
| 2016/0039525 A1 | 2/2016 | Pajic |
| 2016/0135602 A1 * | 5/2016 | Smith ...................... A47C 7/54 297/284.3 |
| 2016/0159254 A1 | 6/2016 | Katoh et al. |
| 2016/0167788 A1 | 6/2016 | Thomaschewski |

OTHER PUBLICATIONS

International Search Report and Written Opinion; dated Jun. 5, 2020; PCT/US2020/019573; entire document.

* cited by examiner

REVERSIBLE SEAT ASSEMBLY

FIELD OF INVENTION

The present invention relates to the field of seat assemblies for use in the transportation industry, including, but not limited to airplane applications.

BACKGROUND

Traditionally, airplanes have been designed to have passenger seats in rows and aligned with one another facing in the same direction. Such passenger seats have traditionally been manufactured to allow the passenger to adjust the position of the seat in a limited number of ways, often times only allowing for a slight reclination of the backrest. Furthermore, passenger airplanes have generally used a forward facing seat arrangement. Some aircrafts, and also other means of transportation such as trains, have incorporated forward facing seats together with backward facing seats within the same passenger area, i.e., cabin, wagon, etc. In such cases, however, the seats are generally intended to remain in a fixed position during an entire travel route. Thus, traditional seats often times create various degrees of physical discomfort, especially during extended travel routes as strain may easily develop on the passenger's muscles, i.e., back, legs, neck, etc.

Given the foregoing drawbacks, there is a need in the transportation industry to provide for a seating alternative that would reduce the physical stress and discomfort. The industry would benefit by providing a seat assembly capable of being disposed into a plurality of different arrangements that would allow a passenger to sit on the seat assembly in a number of different positions. A benefit would be realized by providing a reversible seat assembly that would allow a passenger to sit in a forward facing position. It would be advantageous if such a reversible seat assembly could be adjusted by a passenger allowing him or her to sit in a reverse position.

SUMMARY

The present invention is directed to a reversible seat assembly for use in transportation applications, including in connection with airplanes, ships, trains, busses, and other related means of transportation. The reversible seat assembly comprises a base assembly and a vertical assembly each of which is connected to a support structure, and both of which are collectively disposable into and out of a plurality of travel positions. The reversible seat assembly may be configured for a passenger to sit in a usual position or in a reverse position. The base assembly comprises a left and a right segment connected to and rotationally movable to a central segment. The left and right segments may be disposed transversely to and below the central segment. The vertical assembly comprises a lower and an upper segment connected to and rotationally movable to a middle segment. The lower segment may be transversely disposed to the middle segment in non-obstructing relation to the legs of the passenger when sitting in the reverse position. The lower segment may also be disposed on an opposite side of the middle segment and/or below the central segment. Furthermore, the upper segment may be disposed at an inclined orientation with respect to the plane of the middle segment. The base assembly is movable with respect to the support structure and may be disposed in a raised position at an angle of inclination with respect to the horizontal plane. The vertical assembly is also movable with respect to the support structure and may be disposed in a reclined position with respect to the vertical plane.

In a first travel position, the left, right and central segments of the base assembly are disposed in a substantially coplanar alignment that is roughly coincident to the horizontal plane. In the first travel position the lower, middle and upper segments of the vertical assembly are disposed in a substantially coplanar alignment and at a substantially upright inclination. In the second travel position, the right, left and central segments are disposed in a substantially coplanar alignment and in a raised position, that is, at an inclination above the horizontal plane. In the Second travel position, the lower, middle and upper segments of the vertical assembly are disposed in a substantially coplanar alignment and at substantially reclined position relative to the vertical plane. In the third travel position, the right and left segments of the base assembly are disposed in a substantially transverse alignment to the central segment, which is disposed in a raised position relative to the horizontal plane. In the third travel position, the lower segment is disposed in a substantially transverse alignment to the middle segment, which is itself disposed in a reclined position. In the third travel position, the upper segment is disposed in an inclined position to the middle segment.

DETAILED DESCRIPTION

With initial reference to FIGS. 1-5, the present invention is directed towards a reversible seat assembly 1 that is primarily intended for use in connection with passenger airplanes, but may also be used in connection with other applications including, but not limited to other types of airplanes, such as cargo airplanes, and other means of transportation, including trains, busses and ships. As will be explained in detail, the inventive seat assembly 1 is reversible. That is, the reversible seat assembly 1 may be disposed into and out of a plurality of different positions according to the flight stages of the underlying airplane, train, ship, etc. The different positions of the reversible seat assembly 1 are intended to allow a passenger to sit in usual sitting positions, e.g., with the back against the reversible seat assembly 1, as well as in a reverse position, e.g. with the chest against the reversible seat assembly 1. As will be explained hereinafter, the reversible seat assembly 1 may be adjusted to assume a desired position according the flight stages of the underlying airplane, train or ship.

The reversible seat assembly 1 according to the present invention comprises a base assembly 10 and a vertical assembly 20, both of which are connected to a support assembly 40. The support assembly 40 is generally connected to a portion of the structure of the underlying airplane, including but not limited to a floor. The base assembly 10 and vertical assembly 20 are movable with respect to the support assembly 40. As such, the base assembly 10 and vertical assembly may be collectively disposed into and out of a plurality of different travel positions. The base assembly 10 and vertical assembly 20 each comprise individual components that may be adjusted to enable to be collectively disposed into such different travel positions. It is within the scope of the present invention that such individual components of the base assembly 10 and vertical assembly 20 be connected to each other via suitable connecting mechanisms, including hinges, beckets, braces, mounting components, slidable mechanisms, and other related components. Such connecting mechanisms are intended to selectively enable mobility certain components, while at the same time providing sufficient support when required. Additionally, such connecting mechanisms may comprise motorized components which may enable an automated movement of the various components of the reversible seat assembly 1.

Figure 4:
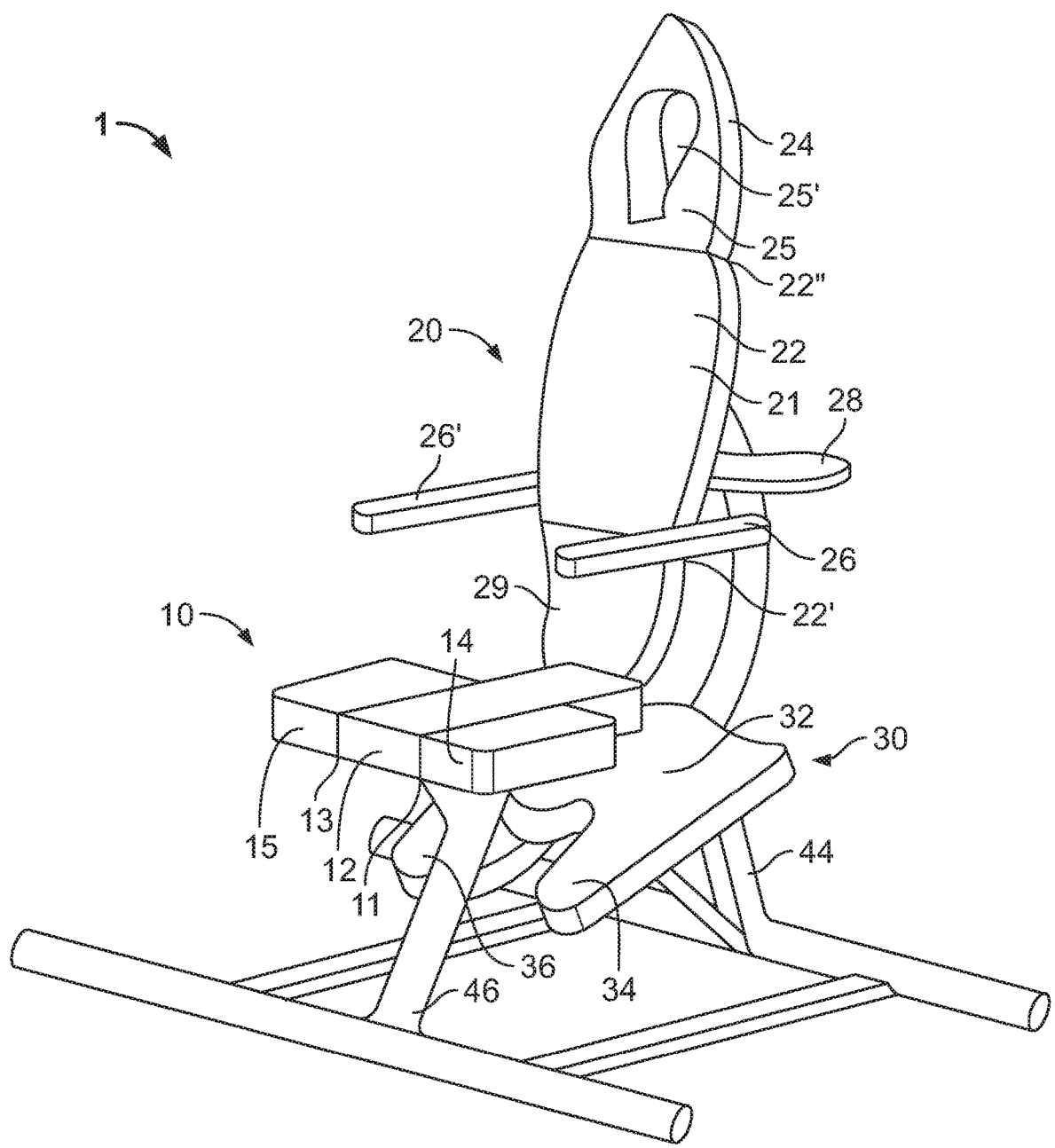
FIG. 4 is a perspective view of an even further embodiment of the reversible seat assembly according to the present invention disposed in the first travel position.

As is perhaps best shown in FIG. 4, the base assembly 10 generally comprises a central segment 12, a right segment 14, and a left segment 15. The base assembly 10 is generally connected to the support assembly 40. For example, the central segment 12 may be connected to a seat support structure 42. The right segment 14 and left segment 15 may be connected, respectively to the right side and left side of the central segment 12. As is perhaps best shown in FIG. 4, initially, the right segment 14, left segment 15, and the central segment 12 may be collectively disposed in a coplanar alignment. As is represented at least in FIG. 1, such initial coplanar alignment may be substantially coincident to the X-axis.

Figure 3:
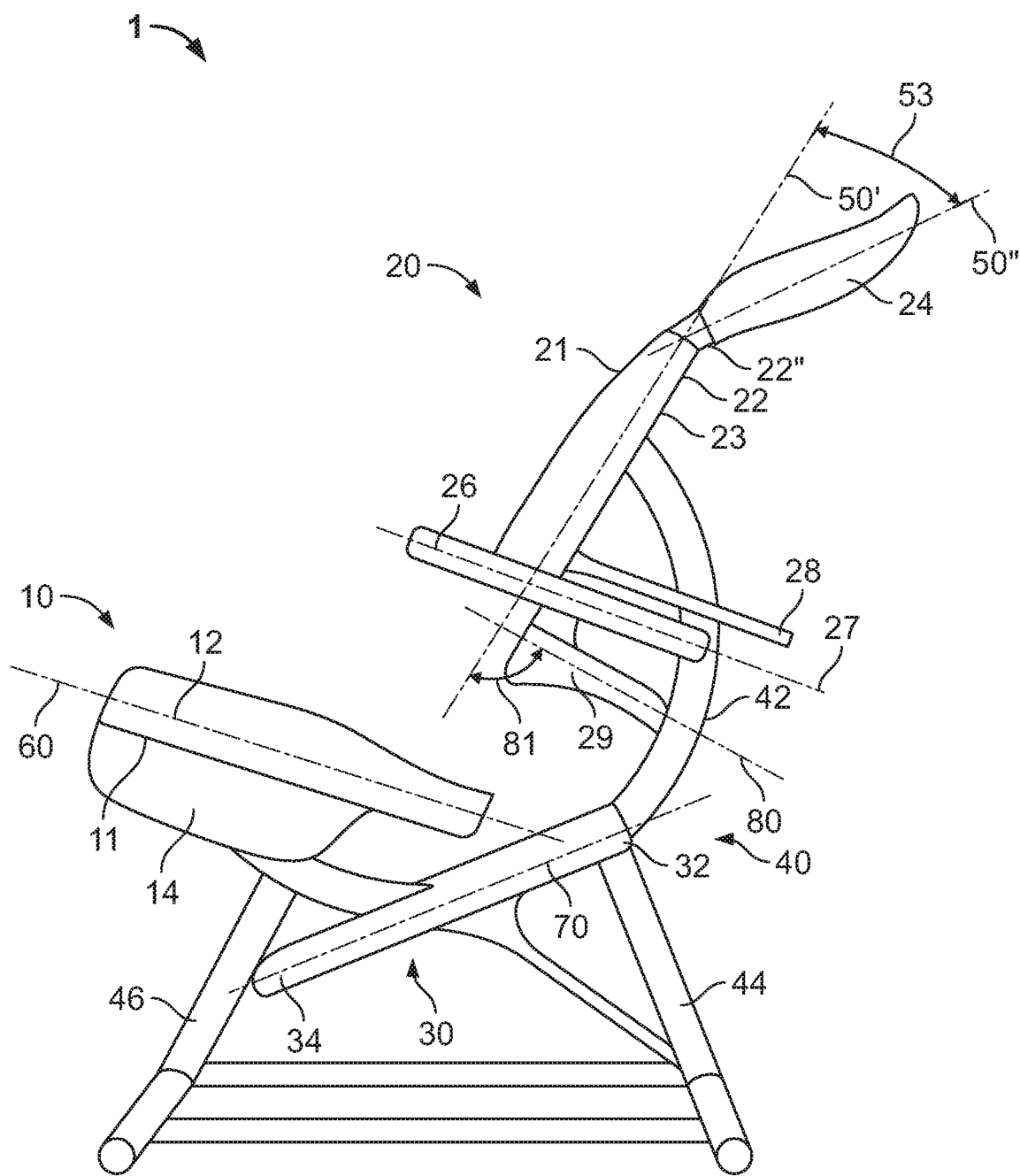
FIG. 3 is a side view of yet another embodiment of the reversible seat assembly according to the preset invention disposed in the third travel position.

As shown in FIG. 3, it is within the scope of the present invention that the right segment 14 and/or left segment 15 be movable with respect to the central segment 12. The right segment 14 and/or left segment 15 may be rotationally movable to the central segment 12. The right segment 14 and/or left segment 15 may be configured to move automatically, for example by incorporating motorized connecting mechanisms, which may be operatively configured with a controller(s) to adjust their position. Alternatively, a user or passenger manually may make such positional adjustments. By way of example, as shown in FIGS. 3 and 4, the right segment 14 may be rotationally movable to a right edge 11 of the central segment 12. As such, the right segment 14 may be movable with respect to the central segment 12 from an initial position as shown in FIG. 4, to another position, such as is shown in FIG. 3. As shown in FIG. 3, the right segment 14 is disposed below the central segment 12. Similarly, in FIG. 3, the right segment 14 is disposed in a substantially transverse alignment to the central segment 12. The left segment 15 may also be rotationally movable with respect to the central segment 12. Thus, the left segment 15 may also be disposed below the central segment 12 and/or in a substantially transverse alignment to the central segment 12.

Figure 1:
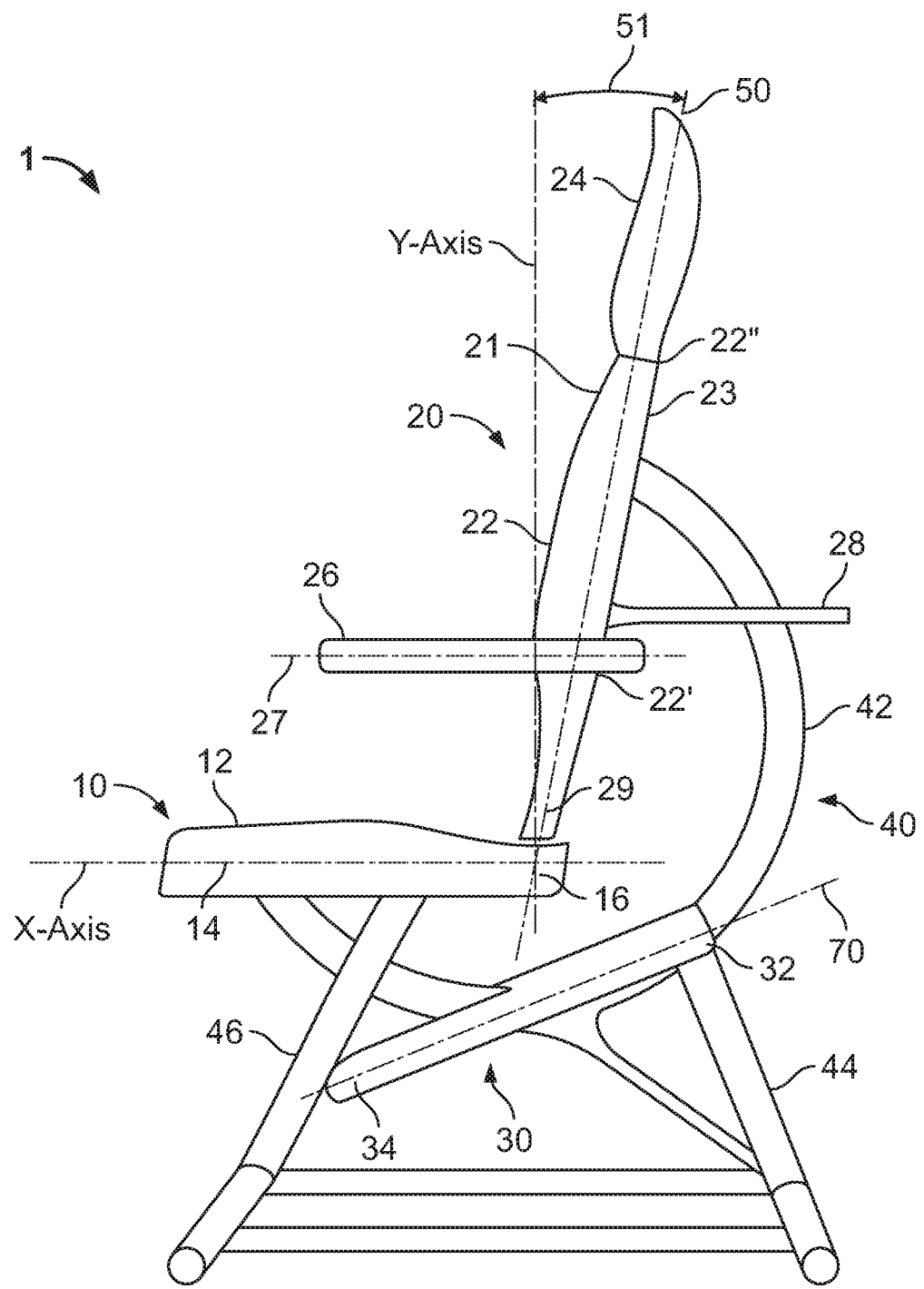
FIG. 1 is a side view of one embodiment of the reversible seat assembly according to the present invention disposed in the first travel position.
Figure 2:
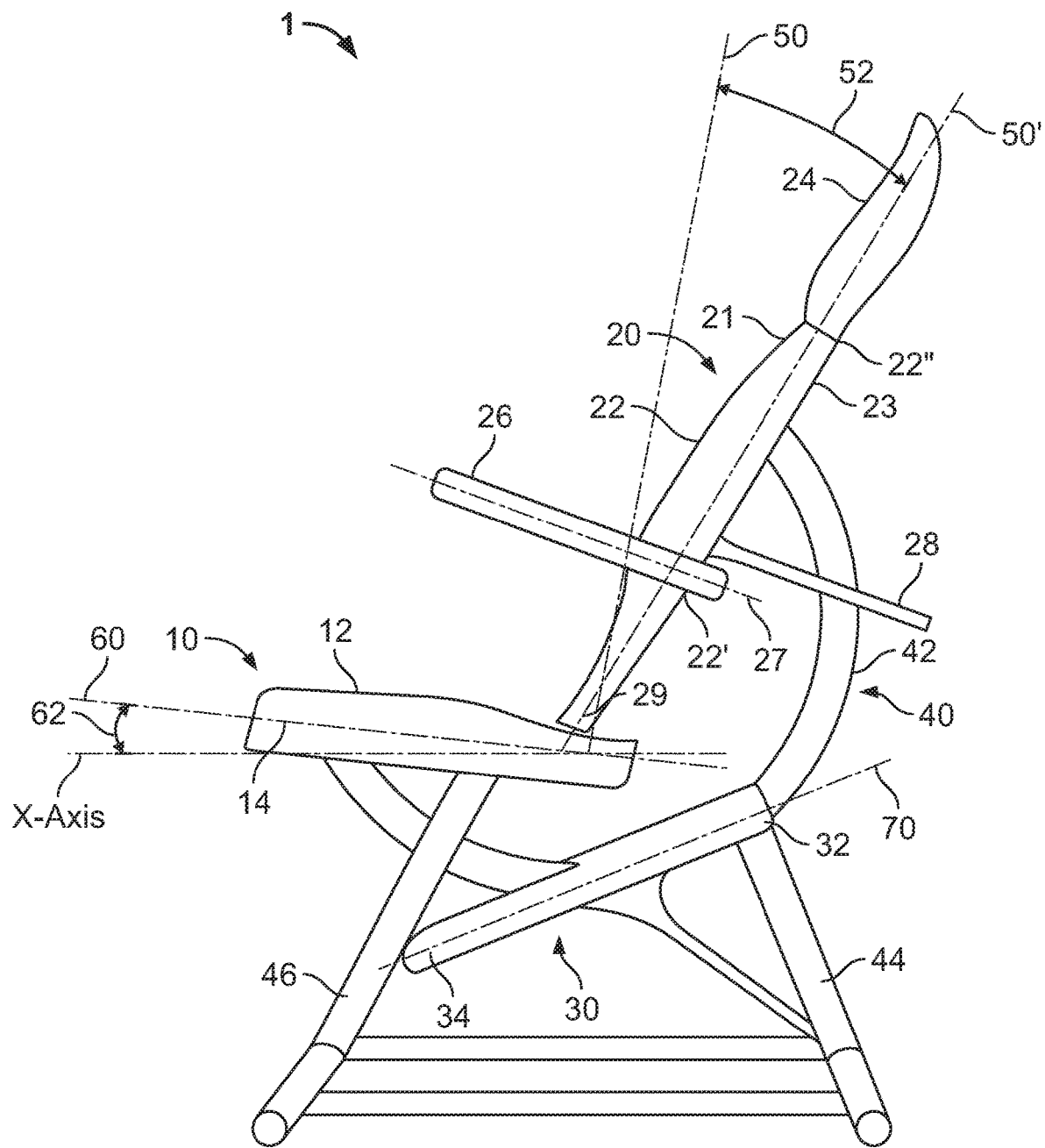
FIG. 2 is a side view of another embodiment of the reversible seat assembly according to the preset invention disposed in the second travel position.

With further reference to at least FIGS. 1 and 4, the different components of the base assembly 10, namely the right segment 14, the left segment 15, and the central segment 12, may be initially disposed in a substantially coplanar alignment that is substantially coincident to the X-axis. As is shown in FIG. 2, in one or more of the travel positions, the base assembly 10 may also be disposed in a raised position with respect to the X-axis. Said differently, the right segment 14, the left segment 15 and the central segment 12 may be disposed in a raised position with respect to the X-axis. As shown in FIG. 3, the central segment 12 may be disposed in the raised position, whereas the right segment 14 and the left segment 15 may be disposed in a transverse alignment to the central segment 12. As shown in FIG. 3, the right segment 14 and the left segment 15 may be disposed in a substantially transverse alignment to the central segment 12, while the central segment 12 itself is disposed in the raised position. In the raised position, the plane 60 of the base assembly 10 will substantially define an angle of inclination 62 with respect to the X-axis. Such angle of inclination 62 with respect to the X-axis may vary, for example, according to preference, but may generally be about 5 degrees to about 10 degrees. The angle of inclination 62 may also be about 8 degrees.

With reference to at least FIGS. 1-3, the vertical assembly 20 generally comprises a lower segment 29, a middle segment 22 and an upper segment 24. The lower segment 29 and the upper segment 24 are generally connected to the middle segment 22. The middle segment 22 generally comprises a front face 21 and an opposite face 23. The middle segment may also comprise a lower edge 22' and/or an upper edge 22". As shown at least in FIGS. 1-2, the lower edge 22' and/or the upper edge 22" may be disposed substantially on the opposite face 23 of the middle segment 22, respectively at an upper end and lower end thereof. It is within the scope of the present invention that the lower edge 22' and upper edge 22" extend across the width of the middle segment 22, in a direction substantially perpendicular to the length of the middle segment 22 and/or the Y-axis. As such, the upper segment 24 may be disposed adjacent to and above the middle segment 22 around the upper edge 22' thereof. The upper segment 24 may also be connected to the middle segment 22 around the upper edge 22' thereof. Furthermore, the upper segment 24 may be rotationally movable with respect to the middle segment 22 around an axis substantially defined by the upper edge 22'. Similar to the segments 14 and 15 of the base assembly 10, the lower segment 29 and/or upper segment 24 may be configured to move automatically, for example with a controller. Alternatively, the user or passenger may make such adjustments manually. As a non-limiting example, the upper segment 24 may be movable with respect to the middle segment 22 from the position as shown in FIG. 2 to the position as shown in FIG. 3. When the upper segment 24 is disposed in the position as shown in FIG. 3, it is said to be in a substantially inclined orientation.

With reference again to at least FIGS. 1-3, the lower segment 29 may be disposed adjacent to and below the middle segment 22 around the lower edge 22" thereof. The lower segment 29 may also be connected to the middle segment 22 around the lower edge 22" thereof. Furthermore, the lower segment 29 may be rotationally movable with respect to the middle segment 22 around an axis substantially defined by the lower edge 22'. As a further non-limiting example, the lower segment 29 may be movable with respect to the middle segment 22 from the position as shown in FIG. 2 to the position as shown in FIG. 3. As shown in FIG. 3, the lower segment 29 may be disposed in a substantially transverse alignment to the middle segment 22 and in non-obstructing relation to the legs of the user. As used herein, a non-obstructing relation to the legs of the user refers to a position of the lower segment 29 that allows the legs of a user, or otherwise passenger, to pass through an opening substantially defined between the bottom of the middle segment 22 of the vertical assembly 20 and the central segment 12 of the base assembly 10. As will be explained hereinafter, in one or more of the travel positions, the user or passenger may choose sit in the reversible seat assembly 1 in a reverse position, that is, with the frontal part of the torso or chest placed against the front face 21 of the middle segment 22. For example, in the embodiment as shown in FIG. 3, which shows the reversible seat assembly 1 disposed in of the plurality of travel positions, the user or passenger may sit in the reverse position. Conversely, in the embodiments shown in FIGS. 1-2 and 4, the user or passenger may sit in a usual position, that is with his or her back placed against the front face 21 of the middle segment 22. As will be explained hereinafter, in the reverse position, the user or passenger may use a leg rest assembly 30 to support his or her legs. In the reverse position, the user or passenger may also use a back armrest 28 to support his or her arms.

As shown throughout the Figures, and as mentioned above, the inventive reversible seat assembly 1 may comprise a leg rest assembly 30. The leg rest assembly 30 comprises a pad 32 configured to support the legs of a user. As shown in FIG. 4, the pad 32 may comprise a right section 34 and a left section 36, which are intended to support to the front portion, i.e., knee and/or shin, respectively of the right leg and the left leg of the user. The leg assembly 30, and more specifically the pad 32, may be aligned with respect to a plane 70 that substantially defines an angle of inclination with respect to the X-axis. The alignment or angle of inclination of the pad 32 may be adjusted according to dimensional parameters, the size of an intended user, and/or preference. Generally, the pad 32 is connected to the support assembly 40. For example, the pad 32 may be connected to the seat support structure 42 of the support assembly 40. Further, the seat assembly 30, and more precisely the pad 32, be disposed below the base assembly 10 and the vertical assembly 20.

As is also shown throughout FIGS. 1-5, further features of the present invention comprise providing a reversible seat assembly 1 with armrests. The reversible seat assembly 1 may comprise side armrests 26 and/or 26', for example to provide support to the elbows and/or arms of the user when sitting in the usual position. The side armrests 26 and 26' may be disposed on a corresponding side of the middle segment 22. The side armrests 26 and 26' may be rotationally movable, upwards or downwards, with respect to a point of attachment or connection to the middle segment 22. The side armrests 26 and/or 26' may also be reciprocally movable with respect to a direction 27 that is substantially coincident with their length. For example, a right side armrest 26 and/or a left side armrest 26' may reciprocally move from the positon as shown in FIG. 2 to the position as shown in FIG. 3, or even further, to permit a user to sit in the reverse position without obstruction. The side armrests 26 and/or 26' may also be rotationally movable with respect to the vertical plane, for example, to place them below a back armrest 28. As mentioned above, the back armrest 28 may be configured to provide support to the arms of the user when sitting in the reverse position. The back armrest 28 may be disposed on the rear face 23 of the middle segment 22. The back armrest 28 may also be disposed in a substantially transverse alignment to the middle segment 22. Thus, as shown in the illustrative embodiment of FIG. 3, while in the reverse position, the user should be able to place the arms around the middle segment 22 and above the back armrest 28.

As mentioned above, the reversible seat assembly according to the present invention may be disposed into and out of a plurality of different travel positions. The plurality of different positions includes a first travel position, a second travel position, and a third travel position. The first travel position is represented in the illustrative embodiments as shown in FIGS. 1 and 4. The first travel position may correspond to the take off and/or landing stage of the flight of an airplane. The first travel position may also correspond to periods of turbulence, and/or ascent or descent of the airplane. In the first travel position, the base assembly 10 is disposed in an alignment that is roughly coincident with the horizontal plane or X-axis. However, an exact alignment of the base assembly 10 to the X-axis is not strictly necessary as some tolerances are within the scope of the present invention. In the first travel position, the right segment 14, the left segment 15 and the central segment 12 are disposed in a coplanar alignment to one another. Thus, such coplanar alignment, respectively of the right segment 14, the left segment 15 and central segment 12, is generally roughly coincident with the horizontal plane or X-axis. Also in the first travel position, the vertical assembly 20 is disposed in a substantially upright alignment. In such a substantially upright alignment, the upper segment 24, middle segment 22 and lower segment 29 are disposed in substantially coplanar alignment. As is perhaps best shown in FIG. 1, in the first travel position, the plane 50 of the vertical assembly 20 is disposed at a slight inclination away from the vertical plane or Y-axis, substantially defining an angle of inclination 51. Such angle of inclination 51 away from the Y-axis may be about 5 degrees to about 15 degrees. The angle of inclination 51 away from the Y-axis may also be about 10 degrees.

As shown in FIG. 2, in the second travel position, the vertical assembly 20 is generally disposed in a reclined alignment. The second travel position may correspond to the travel stage following take-off and/or ascent of the airplane, but before descent of the airplane and/or landing. In the second travel position, the base assembly 10 may also be disposed in a substantially raised position. In the second travel position, the vertical assembly 20, namely, one or more of the middle segment 22, lower segment 29, and/or upper segment 24 may be disposed in a substantially coplanar alignment to one another. It is within the scope of the present invention that the inclination of the various components of the base assembly 10 and the vertical assembly 20 be controlled automatically, or alternatively manually by the passenger. In the second travel position, the plane 50' of the vertical assembly 20 may be disposed at an angle inclination away from to the vertical plane or Y-axis. Said differently, and as shown in FIG. 2, in the second position, the plane 50' of the vertical assembly 20 in the reclined position may substantially define an angle of inclination 52 with respect to the plane 50 of the vertical assembly in the upright position. Such angle of inclination 52 may be about 17 degrees to about 27 degrees. The angle of inclination 52 may also be about 22 degrees. As is also shown in FIG. 2, in the second travel position, the base assembly 10 is disposed in a substantially raised position with respect to the horizontal plane or X-axis. That is, in the second travel position, the plane 60 of the base assembly may substantially define an angle of inclination 62 with respect to the horizontal plane or X-axis. Alternatively, and according to individual preferences, in the second travel position the right segment 14 and/or left segment 15 of the base assembly 10 may be rotated and disposed transversely to and below the central segment 12. Similarly, in the second travel position, the upper segment 24 and/or lower segment 29 may be rotated, forward or backwards, according to individual preferences to improve comfort.

FIG. 3 shows an illustrative embodiment of the inventive reversible seat assembly 1 disposed in the third travel position. Similar to the second travel position, the third travel position may correspond to the travel stage following take off and/or ascent of the airplane, but before descent of the airplane and/or landing. In the third travel position, the base assembly 10 may be disposed in the raised position as described herein. However, in the third travel position, the right segment 14 and the left segment 15 of the base assembly 10 are generally disposed in a transverse alignment below the central segment 12. This is generally done so to further enable a non-obstruction relation of the user's legs when the user sits in the reverse position. Further, when the right segment 14 and the left segment 14 of the base assembly are disposed transversely below the central segment 12, this enables the user's legs to more freely move upwards and/or downwards such that they may be placed on the pad 32 with relative ease. Such arrangement of the base assembly 10, as is shown in FIG. 3, generally enables a more comfortable posture when the user sits in the reverse position.

As may also be appreciated from FIG. 3, in the third travel position, the middle segment 22 is generally disposed in the reclined orientation. However, the lower segment 29 and/or upper segment 24 may be disposed in a different position than the middle segment 22. In an alternative embodiment, the lower segment 29 and/or upper segment 24 may be disposed in a coplanar alignment with respect to the middle segment 22. However, as is shown in the illustrative embodiment of FIG. 3, in the third travel position the lower segment 29 is generally disposed in a substantially transverse alignment to the middle segment 22 to enable a non-obstructing relation to the legs of the user. Also as shown in the illustrative example of FIG. 3, in the third travel position the upper segment 24 is generally disposed in substantially inclined orientation to the middle segment 22 such that the plane 50" of the upper segment substantially defines an angle of inclination 53 with respect to the plane 50' of the middle segment 22. The angle of inclination 53 of the upper segment 24 may vary according to preference and to enable a comfortable position of the user, but may be about 25 degrees to about 35 degrees. The angle of inclination 53 may be about 30 degrees.

With reference now to FIG. 4, it is within the scope of the present invention that while sitting in the reverse position, the user may place his or her face on the front face 25 of the upper segment 24. Accordingly, the upper segment 24 is generally structured to enable a comfortable reverse sitting position. Thus, the upper segment 24 may comprise a front face 25 with an opening 25' formed thereon. The opening 25' is intended to enable a non-obstructing relation to the eyes, nostrils, and/or mouth of the user such that vision and/or breathing are unobstructed. The upper segment 24, including the front face 25 and opening 25', should therefore have a geometry which sufficiently supports the head of the user when in the usual sitting position, i.e., with the back of his/her head against the front face 25 of the upper segment 24. Said differently, the size of the opening 25' should be sufficient for the user to see and/or breathe while sitting in the reverse position. But also, the size of the opening 25' should not be too large in order for the upper segment 24 to provide enough support to the head of the user without the head passing or sliding through the opening 25'.

Even further features of the present invention comprise providing a reversible seat assembly 1 with a seat support structure 40 that may enable movement of the base assembly 10 and/or the vertical assembly 20. As shown throughout the Figures, and as mentioned above, a support assembly 40 may be provided, which may not only connect the base assembly 10 and/or vertical assembly 20 to the underling airplane, train, bus or ship, but which may also enable moment of the different components. Thus, it is within the scope of the present invention that the support assembly 40 to enable movement of at least the middle segment 22 and/or central segment 12 in order to dispose the reversible seat assembly 1 into a desired one of the plurality of travel positions. Thus, a support assembly 40 may be provided comprising a seat support structure 42, a front support structure 46 and/or a rear support structure 44. The rear support structure 44 and the front support structure 46 are primarily intended to provide structural support and/or stability to the rest of the components of the reversible seat assembly 1. The seat support structure 42, is intended to connect the base assembly 10 and vertical assembly 20 to the rest of the support assembly 40 and consequently the structure of the airplane, train, or ship. As is perhaps best shown in FIGS. 1-3, the seat support structure 42 may comprise a substantially semi-circular shape. The base assembly 10 may be connected to one end of a substantially semi-circular seat support structure 42, whereas the horizontal assembly 20 may be connected to the other end thereof. The pad 32 may also be connected to at least a portion of the seat support structure 42. A semi-circular support structure 42 may comprise an outer semi-circular tube, and one or more smaller semi-circular tubes to enable a telescopic connection between them. With such a telescopic connection of the seat support structure 42, the vertical assembly 20 and or base assembly 10 may be adjusted, for example, from the positions shown in FIG. 1 to those shown in FIGS. 2 and/or 3.

Figure 5:
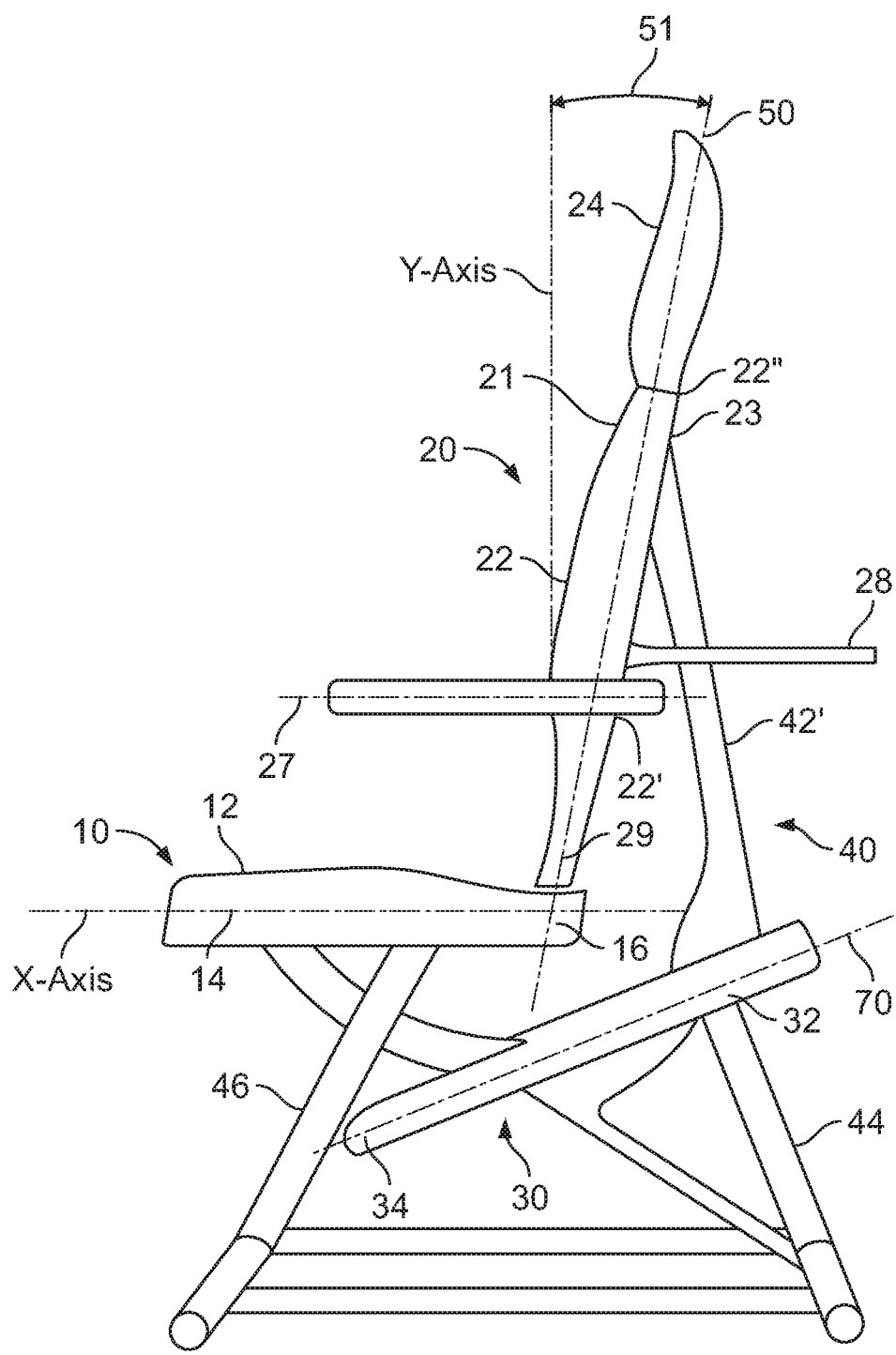
FIG. 5. is a side view of even another embodiment of the reversible seat assembly according to the present invention disposed in the first travel position.

With reference now to FIG. 5, the present invention may comprise a reversible seat assembly 1 with a support structure 42' comprising a substantially straight shape in lieu of a substantially semi-circular one. It is contemplated that various reversible seat assemblies 1 may be disposed along successive rows, i.e., one row of seats behind another within a passenger airplane, train, boat, etc. Thus, while the exact geometry of the support structure 42' may vary, it should at least partially increase the passenger space between successive rows of reversible seat assemblies 1. Said differently, a support structure 42' comprising a substantially straight shape may at least partially increase the passenger space, between two or more adjacent rows of reversible seat assemblies 1, with respect to a support structure 42 comprising a substantially semi-circular shape.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A reversible seat assembly connected to at least a portion of the inside of an airplane, said reversible seat assembly comprising:
    a base assembly comprising a left segment, a right segment and a central segment, said left segment and said right segment adjacently disposed to said central segment,
    a vertical assembly comprising a lower segment, a middle segment and an upper segment, said upper segment comprising an opening and configured to support the face of a user, said lower segment disposed below said middle segment, said upper segment disposed above said middle segment, said middle segment comprising a front face and a rear face, said front face configured to support the back or chest of the user during a travel position, said rear face oppositely disposed to said front face, said right segment rotationally movable in a downward direction with respect to a right edge of said central segment, said left segment rotationally movable in a downward direction with respect to a left edge of said central segment, said lower segment rotationally movable with respect to a lower edge of said middle segment and towards said rear face of said middle segment, said upper segment rotationally movable with respect to an upper edge of said middle segment and toward said rear face of said middle segment, said base assembly and said vertical assembly connected to a support structure and collectively disposable into and out of a first travel position, a second travel position, and a third travel position, said first travel position comprising:
said left segment, said central segment and said right segment disposed in a substantially coplanar alignment to one another and substantially coincident with the horizontal plane, and
said lower segment, said middle segment and said upper segment disposed in a substantially upright alignment, said second travel position comprising:
said left segment, said central segment and said right segment disposed in a substantially coplanar alignment to one another in a substantially raised position, and
said lower segment, said middle segment and said upper segment disposed in a substantially coplanar alignment to one another and in a substantially reclined orientation, and said third travel position comprising:
each one of said left segment and said right segment disposed in a substantially transverse alignment to said central segment,
said middle segment disposed on a substantially reclined orientation,
said lower segment disposed in a substantially transverse alignment to said middle segment towards said rear face thereof and in non-obstructing relation to the legs of the user, and
said upper segment disposed in a substantially inclined orientation to said middle segment.

2. The reversible seat assembly as recited in claim 1 wherein in said third travel position each one of said left segment and said right segment are disposed in a substantially transverse alignment to and below said middle segment and in non-obstructing relation to the legs of the user.

3. The reversible seat assembly as recited in claim 1 further comprising a leg rest assembly connected to said support structure and disposed below said base assembly.

4. The reversible seat assembly as recited in claim 1 further comprising a right side arm rest and a left side arm rest each one disposed on a corresponding side of said middle segment.

5. The reversible seat assembly as recited in claim 4 wherein said right side armrest is reciprocally movable along a length thereof and said left side arm rest is reciprocally movable along a length thereof.

6. The reversible seat assembly as recited in claim 1 further comprising a back armrest disposed on said rear face of said middle segment.

7. The reversible seat assembly as recited in claim 6 further comprising a right side arm rest and a left side arm rest each one disposed on a corresponding side of said middle segment.

8. The reversible seat assembly as recited in claim 7 wherein said right side armrest is reciprocally movable along a length thereof and said left side arm rest is reciprocally movable along a length thereof.

9. The reversible seat assembly as recited in claim 8 wherein in said third travel position each of said left side armrest and said right side armrest are disposed in a substantially parallel orientation to and below said back armrest.

10. The reversible seat assembly as recited in claim 8 wherein in said third travel position each of said left side armrest and said right side armrest are disposed in a non-obstructing relation to the chest of the user.

11. The reversible seat assembly as recited in claim 8 wherein said right side armrest and said left side armrest are substantially disposed on said rear face of said middle segment.

12. A reversible seat assembly connected to at least a portion of the inside of an airplane, said reversible seat assembly comprising:
a base assembly comprising a left segment, a right segment, and a central segment, said left segment and said right segment adjacently disposed to said central segment,
a vertical assembly comprising a lower segment, a middle segment and an upper segment, said upper segment comprising an opening and configured to support the face of a user,
a back armrest connected to an opposite side of said middle segment,
a right side armrest and a left side armrest each one disposed on a corresponding side of, and in a substantially intersecting alignment to, said middle segment,
each one of said right side armrest and said left side arm rest reciprocally movable along a length thereof,
said lower segment disposed below said middle segment, said upper segment disposed above said middle segment,
said middle segment comprising a front face and a rear face, said front face configured to support the back or chest of the user during a travel position, said rear face oppositely disposed to said front face,
said right segment rotationally movable in a downward direction with respect to a right edge of said central segment, said left segment rotationally movable in a downward direction with respect to a left edge of said central segment,
said lower segment rotationally movable with respect to a lower edge of said middle segment and towards said rear face of said middle segment,
said upper segment rotationally movable with respect to an upper edge of said middle segment and toward said rear face of said middle segment,
said base assembly and said vertical assembly connected to a support structure connected to a floor of the airplane and collectively disposable into and out of a first travel position, a second travel position, and a third travel position, said first travel position comprising:
- said left segment, said central segment and said right segment disposed in a substantially coplanar alignment to one another to one another substantially coincident with the horizontal plane, and
- said lower segment, said middle segment and said upper segment disposed in a substantially upright alignment, and said second travel position comprising:
- said left segment, said central segment and said right segment disposed in a substantially coplanar alignment to one another in a substantially raised position, and
- said lower segment, said middle segment and said upper segment disposed in a substantially coplanar alignment to one another and in a substantially reclined orientation comprising an angle of inclination away from the vertical plane, and said third travel position comprising:
- each one of said left segment and said right segment disposed in a substantially transverse alignment to said central segment,
- said middle segment disposed on a substantially reclined orientation comprising an angle of inclination away from the vertical plane,
- said lower segment disposed in a substantially transverse alignment to said middle segment and in non-obstructing relation to the legs of the user,
- said upper segment disposed in a substantially inclined orientation to said middle segment comprising an angle of inclination away from said middle segment, and
- each of said left side armrest and said right side armrest disposed in a substantially parallel orientation to and below said back armrest and in non-obstructing relation to the chest of the user.

* * * * *